United States Patent Office 3,151,018
Patented Sept. 29, 1964

3,151,018
PROCESS FOR THE CONTROL OF SLIME-FORMING AND OTHER MICROORGANISMS WITH CHLOROPHENYLTRICHLOROMETHYL CARBINOL
Theodore A. Girard, Wayne Township, Passaic County, N.J., assignor, by mesne assignments, to Heyden Newport Chemical Corporation, a corporation of Delaware
No Drawing. Filed Oct. 17, 1961, Ser. No. 145,744
11 Claims. (Cl. 162—161)

This invention relates to a process for inhibiting or preventing the growth of microorganisms in water systems. More particularly, it relates to a process for the control of slime-forming and other microorganisms in industrial systems involving water and substances that are normally susceptible to microbiological degradation in the presence of water. It further relates to microbiocidal compositions that can be used to control the growth of such microorganisms.

Many industrial products, such as wood pulp, starch and protein materials, animal hides, vegetable tanning liquors and the like, when wet or subjected to treatment in water are susceptible to degradation or deterioration resulting from the growth of bacteria and other microorganisms or by enzymes produced by such growth. In other industrial applications where water is employed, such as in cooling towers, spray condensers, gravel filters, and the like, the growth of microorganisms may produce slime or other solid accumulations which may interfere with the proper functioning of equipment by decreasing the rate of flow of water and the rate of heat transfer.

Slime, such as that encountered in paper mill systems, consists of microorganisms, particularly bacteria and fungi, and accumulations of fibers and debris that are matted together to form masses and deposits that may be stringy, pasty, rubbery, gelatinous, mealy, hard, or horny. It may have acquired color and may have a characteristic odor.

Slime in pulp and paper systems presents a number of problems to the paper manufacturer. For example, it prevents normal flow of stock suspensions by clogging felts, wires, and screens. In addition it may become incorporated in the paper sheet, thus reducing its strength and resulting in a product having unsightly spots and holes.

A number of agents have heretofore been used to control the growth of slime-forming microorganisms in paper mill and other industrial water systems. These include, for example, chlorine, organic and inorganic salts of copper and silver, organic mercury compounds, chlorinated phenolic compounds, sulfur-containing organic compounds, and quaternary ammonium compounds. While each of these agents inhibits or prevents the growth of certain of the slime-forming microorganisms, none meets all of the requirements that have been established for slime-control agents for use in industrial water systems and particularly for use in paper mill water systems. For example, chlorine used alone or in combination with ammonia often does not provide adequate control of microorganisms and does not persist in the system for a prolonged period of time. In addition at chlorine concentrations sufficient to control slime formation considerable corrosion of metal parts of the equipment may take place. The organic and inorganic metallic salts find limited use in slime control because of their high toxicity and their corrosivity. The organic mercury compounds, such as phenyl mercury salts, are effective in the control of microorganisms, but they may cause embrittlement or crystallization of brass screens and other metal equipment. There is also the possibility that trace amounts of mercury may contaminate food that is packaged in paper prepared in the presence of these compounds. Chlorinated phenols are good slime control agents, but they have an unpleasant odor and taste that are imparted to the water and to the paper. Such paper is unsuitable for use in the packaging of foods and similar products. The organic sulfur compounds, while generally non-toxic, are often relatively inefficient in the control of slime-forming microorganisms. They are also corrosive to brass and bronze equipment, and they may form dissociation products that ultimately interfere with the dyeing of the paper products. Quaternary ammonium compounds have proven to be unsatisfactory as slime-control agents since they are so substantive to paper fiber that they are rapidly depleted from the system. Also these compounds cause foaming, and their use may bring about changes in the properties of the paper stock.

It has now been found that the growth of microorganisms in industrial water systems can be controlled by treating the system with a chlorophenyltrichloromethyl carbinol. In addition to inhibiting the formation and growth of slime, this treatment also prevents the microbiological deterioration of wood pulp or other organic materials that are present in the system. Besides effectively controlling the growth of these microorganisms for prolonged periods even when used at very low concentrations, the chlorophenyltrichloromethyl carbinols meet all of the other requirements that have been established for slime-control agents. They do not react with such metals as brass, copper, or stainless steel or cause corrosion or embrittlement of these metals. They do not cause foaming of the system or the formation of pitch or tars on the felts. They are non-toxic to warm-blooded animals as well as to fish and other forms of aquatic life. They are not inactivated by chemicals which are commonly used in paper processing. They do not impart color or odor to the paper, nor do they interfere with subsequent dyeing operations.

The chlorophenyltrichloromethyl carbinols that have proven useful in the control of slime-forming and other micro-organisms have the formula

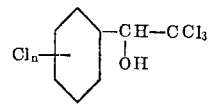

wherein $n$ represents a number in the range of 1 to 3. Illustrative of these compounds are o-chlorophenyltrichloromethyl carbinol, p-chlorophenyltrichloromethyl carbinol, 2,4-dichlorophenyltrichloromethyl carbinol, 3,4-dichlorophenyltrichloromethyl carbinol, 2,4,5-trichlorophenyltrichloromethyl carbinol, and 2,3,6-trichlorophenyltrichloromethyl carbinol. The most active of these compounds as slime-control agents are the dichlorophenyltrichloromethyl carbinols. 3,4-dichlorophenyltrichloromethyl carbinol is particularly active as a slime-control agent. A single carbinol or a mixture of two or more of these compounds may be used in the practice of the present invention.

The carbinols may be prepared by an convenient procedure. They may be prepared, for example, by the reaction of the appropriate chlorobenzaldehyde with chloroform in the presence of potassium hydroxide or by the reaction of a chlorobenzene with chloral in the presence of an aluminum chloride catalyst.

While the carbinols may be used as such in the process of the present invention, they are usually and preferably used in combination with an inert carrier which facilitates the dispensing of dosage quantities of the carbinol and assists in its rapid dispersion throughout the system. The carbinols may be mixed with or deposited upon inert particulate solids, such as fullers earth, talc, diatomaceous earth, hydrated calcium silicate, kaolin, and the like, to form dry particulate compositions. Such compositions may if desired be dispersed in water with or without the aid of a surface-active agent.

The carbinols are preferably dispensed in the form of solutions or dispersions in inert organic solvents or in mixtures of inert organic solvents and water. Such compositions generally contain approximately 5% to 80% by weight and preferably 10% to 50% by weight of the carbinol. The solvents that may be used in the preparation of these compositions include both polar and nonpolar aliphatic and aromatic solvents. The most satisfactory compositions are those that contain polar solvents. Illustrative of the solvents that may be used in the preparation of the compositions are benzene, toluene, xylene, naphtha, nitrobenzene, dimethylformamide, carbon tetrachloride, acetone, acetic acid, ethanol, and dioxane. A single solvent or a mixture of solvents may be used.

To assist in their rapid and complete dispersion in the water system, the compositions may contain approximately 5% to 30% by weight and preferably 10% to 20% by weight of an anionic or a nonionic surface-active agent. Suitable surface-active agents include sodium dialkyl sulfosuccinates, sodium alkyl sulfates, sodium arylsulfonates, sorbitan esters of fatty acids, polyoxyalkylenesorbitan esters of fatty acids, and fatty acids esters of polyhydric alcohols. The compositions may also contain water in the amount of approximately 5% to 75% by weight and preferably 20% to 50% by weight.

In the practice of the present process for the control of slime in paper-making operations, a composition containing the chlorophenyltrichloromethyl carbinol is added to the pulp or furnish and circulating waters associated therewith in an amount sufficient to control the growth of the microorganisms. As little as 0.005 pound of carbinol may be added per ton of dry paper produced to inhibit slime formation. When severe slime conditions are encountered, five pounds or more of the carbinol per ton of dry paper produced may be required to achieve satisfactory slime control. Ordinarily approximately 0.05 pound to 1 pound of the carbinol is added per ton of dry paper produced. The composition may be added at any of the units or machines used in the process with the choice in each case dependent upon such factors as the process employed, the type of paper being produced, etc. It is preferably added at the site or sites of greatest slime accumulation, which are usually at or near the paper-making machine. The remainder of the system, which is generally fed with considerable amounts of recirculating white water, should contain sufficient carbinol to inhibit slime formation and growth.

The chlorophenyltrichloromethyl carbinols of the present invention may be used as the sole slime-control agent in an industrial water system, or they may be used in combination with one or more other slime-control agents.

This invention is further illustrated by the examples that follow. It is to be understood, however, that these examples are given solely for the purpose of illustration and that the invention is not to be regarded as limited to any of the specific materials or conditions recited therein except as set forth in the appended claims.

EXAMPLE 1

The effectiveness of 3,4-dichlorophenyltrichloromethyl carbinol in the control of slime-forming microorganisms was determined by carrying out pulp-substrate tests using pure cultures of microorganisms that are representative of those ordinarily found in paper mill slime. The carbinol was tested as an emulsion concentrate that contained 33.3% of 3,4-dichlorophenyltrichloromethyl carbinol, 12.5% of sodium diamyl sulfosuccinate, 12.5% of dimethylformamide, and 41.7% of water. For comparative purposes a parallel series of tests was carried out using a microbiocidal composition that contained as its active ingredients 46% of the zinc salt of dimethyl dithiocarbamic acid and 4% of the zinc salt of 2-mercaptobenzothiazole. This composition is marketed as Vancide 51 Z by R. T. Vanderbilt Co.

The tests were carried out by adding the microbiocidal compositions at various levels to flasks containing 70 ml. of a 0.30% aqueous bleached sulfite pulp suspension previously adjusted to pH 5.5 with alum. Each flask was then inoculated with a standardized culture of the microorganism. The flasks were placed on a reciprocating shake machine and allowed to incubate at 37° C. for periods ranging from 3 to 24 hours. After each incubation period, a portion of the pulp culture was withdrawn, diluted, and plated on a nutrient agar medium. Quantitative bacterial or fungal counts were then made. The results obtained are given in Table I.

*Table I*

ACTIVITY OF 3,4-DICHLOROPHENYLTRICHLOROMETHYL CARBINOL AGAINST SLIME-FORMING MICROORGANISMS

| Slime-Control Agent | Microorganism | | | | | | | | | | | | |
|---|---|---|---|---|---|---|---|---|---|---|---|---|---|
| | Aerobacter aerogenes | | | | | Aspergillis niger | | | | | Penicillium expansum | | | |
| | Conc. (p.p.m.) of Microbiocidal composition | Average bacterial count in thousands/ml./contact time | | | | Conc. (p.p.m.) of Microbiocidal composition | Average mold count in thousands/ml./contact time | | | | Conc. (p.p.m.) of Microbiocidal composition | Average mold count in thousands/ml./contact time | | | |
| | | 0 Hrs. | 3 Hrs. | 6 Hrs. | 24 Hrs. | | 0 Hrs. | 3 Hrs. | 6 Hrs. | 24 Hrs. | | 0 Hrs. | 3 Hrs. | 6 Hrs. | 24 Hrs. |
| None | | 463 | 470 | 410 | 600 | | 146 | 130 | 116 | 88 | | 123 | 136 | 155 | 123 |
| 3,4-Dichlorophenyltrichloromethyl carbinol (as a composition containing 33.3% of the carbinol). | 10 | | 460 | 450 | 194 | 25 | | 64 | 81 | 63 | 25 | | 118 | 137 | 83 |
| | 20 | | 79 | 25 | 8 | 50 | | 50 | 68 | 32 | 50 | | 146 | 114 | 88 |
| | 40 | | 1 | <1 | <1 | 100 | | 52 | 52 | 18 | 100 | | 66 | 53 | 13 |
| Vancide 51 Z (a composition containing 46% of the zinc salt of dimethyl dithiocarbamic acid and 4% of the zinc salt of 2-mercaptobenzothiazole). | 10 | | 530 | 493 | 116 | 25 | | 135 | 105 | 65 | 25 | | 135 | 150 | 117 |
| | 20 | | 536 | 400 | 90 | 50 | | 140 | 86 | 56 | 50 | | 146 | 143 | 110 |
| | 40 | | 470 | 300 | 20 | 100 | | 140 | 96 | 50 | 100 | | 135 | 150 | 114 |

From the data in Table I it will be seen that 3,4-dichlorophenyltrichloromethyl carbinol is a very fast-acting and efficient agent for the control of representative slime-forming microorganisms. It is appreciably more effective as a slime-control agent after both short and prolonged contact periods than the commercially-available slime-control agent that was used in the comparative tests.

EXAMPLE 2

A series of slime-control experiments was carried out in a paper mill that was producing newsprint from pulp that consisted of approximately 80% of groundwood pulp and 20% of sulfite pulp. In these experiments, which are summarized in Table II, varying amounts of Vancide 51 Z and of a 33.3% 3,4-dichlorophenyltrichloromethyl carbinol composition were added to the pulp. Each experiment was continued during one week's operation of the paper mill.

Good control of slime-forming microorganisms was obtained throughout the series of experiments. It was noted, however, that the bacterial counts of samples of the pulp declined substantially as the amount of 3,4-dichlorophenyltrichloromethyl carbinol in the water system was increased.

Table II

| Experiment No. | Groundwood Pulp | | Sulfite Pulp | |
|---|---|---|---|---|
| | Slime-Control Agent | Amount (lb. per ton of paper produced) | Slime-Control Agent | Amount (lb. per ton of paper produced) |
| 1 | Vancide 51 Z | 0.25 | Carbinol [1] | 0.15 |
| 2 | Carbinol [1] | 0.14 | Vancide 51 Z | 0.25 |
| 3 | ----do---- | 0.11 | Carbinol [1] | 0.087 |
| 4 | Vancide 51 Z | 0.25 | ----do---- | 0.15 |

[1] Carbinol = Composition containing 33.3% of 3,4-dichlorophenyltrichloromethyl carbinol, 12.5% of sodium diamyl sulfosuccinate, 12.5% of dimethylformamide, and 41.7% of water.

EXAMPLE 3

The effectiveness of chlorophenyl trichloromethyl carbinols in the control of the growth of representative bacteria and fungi was determined. For comparative purposes, G-4 (bis (5-chloro-2-hydroxy-phenyl) methane) was included in the tests.

The bactericidal activity and the fungicidal activity of the compounds were determined by means of standard serial dilution tests. In Table III the activity of the test compounds against the specified bacteria and fungi is expressed as the reciprocal of the minimum concentration that will inhibit growth of organism. Thus a concentration of 1 part of the compound in 1,000,000 (or $1 \times 10^{-6}$) parts of solution will be reported as 6.

What is claimed is:

1. The process of inhibiting microbiological deterioration of organic substances that are normally susceptible to deterioration by the action of microorganisms and inhibiting the formation of slime in water systems that are in contact with such substances which comprises adding to the water system a carbinol having the formula

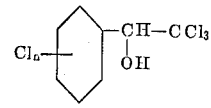

wherein $n$ represents a number in the range of 1 to 3 in an amount sufficient to prevent microbiological deterioration of the organic substances and inhibit the formation of slime in the water system.

2. A process as defined in claim 1 wherein the carbinol is a dichlorophenyltrichloromethyl carbinol.

3. A process as defined in claim 1 wherein the carbinol is 3,4-dichlorophenyltrichloromethyl carbinol.

4. A process of inhibiting the formation and growth of slime in a paper mill water system which comprises introducing to the system a microbiocidally effective amount of a carbinol having the formula

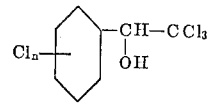

wherein $n$ represents a number in the range of 1 to 3.

5. A process of inhibiting the formation and growth of slime in a paper mill water system comprising an aqueous dispersion of paper-making fibers which comprises introducing to the system approximately 0.005 pound to 5 pounds of a dichlorophenyltrichloromethyl carbinol for each ton of paper produced.

6. A process of inhibiting the formation and growth of slime in a paper mill water system comprising an aqueous dispersion of paper-making fibers which comprises introducing to the system approximately 0.05 pound to 1 pound of 3,4-dichlorophenyltrichloromethyl carbinol for each ton of paper produced.

7. The process of claim 6 in which a microbiocidal composition containing about 5% to 80% by weight of 3,4-dichlorophenyltrichloromethyl carbinol is added to the system.

8. The process of claim 6 in which a composition comprising approximately 10% to 50% by weight of 3,4-dichlorophenyltrichloromethyl carbinol and approximately 5% to 30% of a surface-active agent selected from the group consisting of nonionic surface-active agents and anionic surface-active agents in a solvent mixture comprising an inert organic solvent and water is added to the system.

9. An aqueous suspension of cellulosic pulp intended for use in the production of paper which is normally susceptible to microbioligcal deterioration and slime formation and which contains for the purpose of inhibiting such

Table III
MICROBIOCIDAL ACTIVITY OF CHLOROPHENYLTRICHLOROMETHYL CARBINOLS

| Compound | Bacteria | | | | | Fungi | | | | |
|---|---|---|---|---|---|---|---|---|---|---|
| | S. aureus | B. subtilis | E. coli | M. phlei | C. albicans | A. niger | C. globosum | A. oleraceae | A. oryzae | T. mentagrophytes |
| o-Chlorophenyltrichloromethyl carbinol | 4 | 3 | 3 | 6 | 4 | 3 | 4 | 4 | 5 | 4 |
| p-Chlorophenyltrichloromethyl carbinol | 4 | 3 | 4 | 6 | 4 | 4 | 4 | 4 | 4 | 5 |
| 2,4-Dichlorophenyltrichloromethyl carbinol | 5 | 6 | 3 | 5 | 5 | 4 | 3 | 4 | 4 | 6 |
| 3,4-Dichlorophenyltrichloromethyl carbinol | 6 | 4 | 4 | 5 | 5 | 4 | 6 | 5 | 4 | 6 |
| G-4 | 6 | 6 | <3 | 6 | 4 | <3 | 5 | 4 | 3 | 5 |

From the data in Table III, it will be seen that all of the chlorophenyltrichloromethyl carbinols show appreciable activity as bactericides and fungicides. Each of the chlorophenyl trichlorophenyl carbinols can be used to control the growth of slime-forming microorganisms in industrial water systems.

deterioration and slime formation approximately 0.005 pound to 5 pounds per ton of dry pulp of a carbinol having the structure

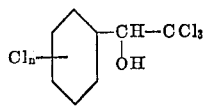

wherein $n$ represents a number in the range of 1 to 3.

10. An aqueous suspension of cellulosic pulp intended for use in the production of paper which is normally susceptible to microbiological deterioration and slime formation and which contains for the purpose of inhibiting such deterioration and slime formation between approximately 0.005 pound and 5 pounds per ton of dry pulp of a dichlorophenyltrichloromethyl carbinol.

11. An aqueous suspension of cellulosic pulp intended for use in the production of paper which is normally susceptible to microbiological deterioration and slime formation and which contains for the purpose of inhibiting such deterioration and slime formation between approximately 0.05 pound and 1 pound per ton of dry pulp of 3,4-dichlorophenyltrichloromethyl carbinol.

References Cited in the file of this patent

UNITED STATES PATENTS 2,106,181    Kreimer _____ Jan. 25, 1938

FOREIGN PATENTS 145,527    Australia _____ May 11, 1936